United States Patent
Lai (10) Patent No.: US 10,653,942 B2
(45) Date of Patent: May 19, 2020

(54) WEARABLE DEVICE, DYNAMIC EVENT RECORDING SYSTEM AND DYNAMIC EVENT RECORDING METHOD THEREOF

(71) Applicant: Wistron Corporation, New Taipei (TW)

(72) Inventor: Cheng-Chia Lai, New Taipei (TW)

(73) Assignee: Wistron Corporation, New Taipei (TW)

( * ) Notice: Subject to any disclaimer, the term of this patent is extended or adjusted under 35 U.S.C. 154(b) by 146 days.

(21) Appl. No.: 15/717,951

(22) Filed: Sep. 28, 2017

(65) Prior Publication Data

US 2018/0333637 A1     Nov. 22, 2018

(30) Foreign Application Priority Data

May 18, 2017   (TW) .............................. 106116530 A (51) Int. Cl.
*G06K 9/00*        (2006.01)
*A63F 3/02*        (2006.01)
(Continued)

(52) U.S. Cl.
CPC .............. *A63F 3/022* (2013.01); *G06F 1/163* (2013.01); *G06K 9/4604* (2013.01); *G06T 7/246* (2017.01);
(Continued)

(58) Field of Classification Search
CPC combination set(s) only.
See application file for complete search history.

(56) References Cited

U.S. PATENT DOCUMENTS

| | | | |
|---|---|---|---|
| 5,659,764 A | * | 8/1997 | Sakiyama ............... G06F 3/017 340/4.13 |
| 9,860,553 B2 | | 1/2018 | Bitouk et al. |

(Continued)

FOREIGN PATENT DOCUMENTS

| | | |
|---|---|---|
| TW | 201703500 | 1/2017 |
| WO | 2015151106 | 10/2015 |

OTHER PUBLICATIONS

"Office Action of Taiwan Counterpart Application", dated Apr. 23, 2018, p. 1-p. 8.

*Primary Examiner* — Alex Kok S Liew
(74) *Attorney, Agent, or Firm* — JCIPRNET (57) ABSTRACT

The invention proposes a wearable device. The wearable device includes an information capturing device and a processing device. The information capturing device is configured to dynamically capture a plurality of partial detected object information of a detected object in a sub-action of a dynamic event. The processing device is coupled to the information capturing device. The processing device is configured to perform an accumulation operation according to the plurality of partial detected object information, so as to obtain a plurality of location information corresponding to the sub-action of the dynamic event. The processing device compares the plurality of location information in the sub-action of the dynamic event with the plurality of location information in a previous sub-action, so as to obtain a sub-object distribution information corresponding to the sub-action of the dynamic event. In addition, a dynamic event recording system and a dynamic event recording method thereof are also provided.

24 Claims, 8 Drawing Sheets

(51) Int. Cl.
  *G06T 7/73* (2017.01)
  *G06T 7/246* (2017.01)
  *H04N 5/232* (2006.01)
  *G06K 9/46* (2006.01)
  *G06F 1/16* (2006.01)
  *H04B 1/3827* (2015.01)
  *H04W 4/80* (2018.01)
  *A63F 9/24* (2006.01)

(52) U.S. Cl.
  CPC ............... *G06T 7/73* (2017.01); *H04N 5/232* (2013.01); *A63F 2009/2435* (2013.01); *A63F 2250/495* (2013.01); *H04B 1/385* (2013.01); *H04W 4/80* (2018.02)

(56) References Cited

U.S. PATENT DOCUMENTS

| | | | |
|---|---|---|---|
| 2003/0138130 A1* | 7/2003 | Cohen | G07F 9/023 382/103 |
| 2006/0033701 A1* | 2/2006 | Wilson | G06F 1/1616 345/156 |
| 2008/0013793 A1* | 1/2008 | Hillis | G03H 1/0005 382/114 |
| 2010/0278393 A1* | 11/2010 | Snook | G06F 3/011 382/107 |
| 2016/0277645 A1 | 9/2016 | Bitouk et al. | |
| 2017/0100661 A1 | 4/2017 | Slav | |

* cited by examiner

|   | A | B | C | D | E | F | G | H | J | K | L | M | N | O | P | Q | R | S | T |
|---|---|---|---|---|---|---|---|---|---|---|---|---|---|---|---|---|---|---|---|
| 19 | 0 | 0 | 0 | 0 | 0 | 0 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 | 0 | 0 | 0 | 0 | 0 | 0 |
| 17 | 0 | 0 | 0 | 0 | 0 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 | 0 | 0 | 1 | 0 | 0 | 0 |
| 15 | 0 | 0 | 0 | 0 | 0 | 0 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 0 | 0 | 0 | 0 | 0 | 0 | 0 | 0 |
| 12 | 0 | 0 | 0 | 0 | 0 | 0 | 0 |   |   |   | 0 | 0 | 0 | 0 | 0 | 0 | 0 | 0 | 0 |
| 11 | 0 | 0 |   |   |   |   |   |   |   |   | 0 | 0 | 0 | 0 | 0 | 0 | 0 | 0 | 0 |
| 10 |   |   |   |   |   |   |   |   |   |   |   | 0 | 0 | 0 | 0 | 0 | 0 | 0 | 0 |
| 9 |   |   |   |   |   |   |   |   |   |   |   | 0 | 0 | 0 | 0 | 0 | 0 | 0 | 0 |
| 8 |   |   |   |   |   |   |   |   |   |   |   | 0 | 0 | 0 | 0 | 0 | 0 | 0 | 0 |
| 7 |   |   |   |   |   |   |   |   |   |   |   |   |   |   |   |   |   |   |   |
| 6 |   |   |   |   |   |   |   |   |   |   |   |   |   |   |   |   |   |   |   |
| 5 |   |   |   |   |   |   |   |   |   |   |   |   |   |   |   |   |   |   |   |
| 4 |   |   |   |   |   |   |   |   |   |   |   |   |   |   |   |   |   |   |   |
| 3 |   |   |   |   |   |   |   |   |   |   |   |   |   |   |   |   |   |   |   |
| 2 |   |   |   |   |   |   |   |   |   |   |   |   |   |   |   |   |   |   |   |
| 1 |   |   |   |   |   |   |   |   |   |   |   |   |   |   |   |   |   |   |   |

| Dynamically capturing a plurality of first partial detected object information and a plurality of second partial detected object information of a detected object in at least one of a plurality of sub-actions in a dynamic event by a first wearable device and a second wearable device | — S1010 |

↓

| Performing an accumulation operation according to the plurality of first partial detected object information or the plurality of second partial detected object information in the at least one of the plurality of sub-actions of the dynamic event, so as to obtain a plurality of first location information or a plurality of second location information in the at least one of the plurality of sub-actions of the dynamic event | — S1020 |

↓

| Comparing the plurality of first location information and the plurality of second location information in the at least one of the plurality of sub-actions of the dynamic event with the plurality of first location information and the plurality of second location information in a previous sub-action, so as to obtain a first sub-object distribution information or a second sub-object distribution information corresponding to the at least one of the plurality of sub-actions of the dynamic event, wherein the previous sub-action is prior to the at least one of the plurality of sub-actions | — S1030 |

FIG. 10

WEARABLE DEVICE, DYNAMIC EVENT RECORDING SYSTEM AND DYNAMIC EVENT RECORDING METHOD THEREOF

CROSS-REFERENCE TO RELATED APPLICATION

This application claims the priority benefit of Taiwan application serial no. 106116530, filed on May 18, 2017. The entirety of the above-mentioned patent application is hereby incorporated by reference herein and made a part of this specification.

BACKGROUND OF THE INVENTION

1. Field of the Invention

The invention relates to a recording technique, and more particularly, to a wearable device, a dynamic event recording system and a dynamic event recording method thereof.

2. Description of Related Art

With blooming development of computing technology in the field of chess-like board games, it is often required to record the playing process for various chess-like board games. However, aside from the manual recording method, the traditional recording method for the playing process must relay on an additional recording apparatus or computer apparatus set up for the recording task, which asks a lot in terms of equipment or computing requirements. Consequently, the traditional recording method for the playing process is lack of efficiency and convenience. In this regard, finding a way to effectively and accurately record the playing process while satisfying the demand for convenience is currently one of the important issues to be addressed.

SUMMARY OF THE INVENTION

The invention provides a wearable device, a dynamic event recording system and a dynamic event recording method thereof, which are capable of providing an effective and accurate recording function for synchronously recording location information of sub-objects in dynamic event.

A wearable device of the invention includes an information capturing device and a processing device. The information capturing device is configured to dynamically capture a plurality of partial detected object information of a detected object in a sub-action of a dynamic event. The processing device is coupled to the information capturing device. The processing device is configured to perform an accumulation operation according to the plurality of partial detected object information, so as to obtain a plurality of location information corresponding to the sub-action of the dynamic event. The processing device compares the plurality of location information in the sub-action of the dynamic event with the plurality of location information in a previous sub-action, so as to obtain a sub-object distribution information corresponding to the sub-action of the dynamic event. The previous sub-action is prior to the sub-action.

A dynamic event recording system of the invention includes a first wearable device and a second wearable device. The second wearable device is wirelessly coupled to the first wearable device. The first wearable device and the second wearable device are configured to dynamically capture a plurality of first partial detected object information and a plurality of second partial detected object information of a detected object in at least one of a plurality of sub-actions in a dynamic event, and perform an accumulation operation according to the plurality of first partial detected object information or the plurality of second partial detected object information in the at least one of the plurality of sub-actions of the dynamic event, so as to obtain a plurality of first location information or a plurality of second location information in the at least one of the plurality of sub-actions of the dynamic event. The first wearable device and the second wearable device compare the plurality of first location information or the plurality of second location information in the at least one of the plurality of sub-actions of the dynamic event with the plurality of first location information and the plurality of second location information in a previous sub-action, so as to obtain a first sub-object distribution information or a second sub-object distribution information corresponding to the at least one of the plurality of sub-actions of the dynamic event. The previous sub-action is prior to the at least one of the plurality of sub-actions.

A dynamic event recording method of the invention includes the following steps: dynamically capturing a plurality of partial detected object information of a detected object in a sub-action of a dynamic event by an information capturing device; performing an accumulation operation according to the plurality of partial detected object information in the sub-action of the dynamic event, so as to obtain a plurality of location information in the sub-action of the dynamic event; and comparing the plurality of location information in the sub-action of the dynamic event with the plurality of location information in a previous sub-action, so as to obtain a sub-object distribution information corresponding to the sub-action of the dynamic event. The previous sub-action is prior to the sub-action.

A dynamic event recording method of the invention includes the following steps: dynamically capturing a plurality of first partial detected object information and a plurality of second partial detected object information of a detected object in at least one of a plurality of sub-actions in a dynamic event by a first wearable device and a second wearable device; performing an accumulation operation according to the first partial detected object information or the second partial detected object information in the at least one of the plurality of sub-actions of the dynamic event, so as to obtain a plurality of first location information or a plurality of second location information in the at least one of the plurality of sub-actions of the dynamic event; and comparing the first location information and the second location information in the at least one of the plurality of sub-actions of the dynamic event with the plurality of first location information and the plurality of second location information in a previous sub-action, so as to obtain a first sub-object distribution information or a second sub-object distribution information corresponding to the at least one of the plurality of sub-actions of the dynamic event. The previous sub-action is prior to the at least one of the plurality of sub-actions.

Based on the above, with the wearable device, the dynamic event recording system and the dynamic event recording method of the invention, the partial detected object information of the detected object in the dynamic event can be dynamically captured, and the accumulation operation can be performed on the partial detected object information, so as to obtain the location information of at least a portion of the detected object in the dynamic event by information accumulation.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In order to make content of the invention more comprehensible, embodiments are described below as the examples to prove that the invention can actually be realized. Moreover, elements/components/steps with same reference numerals represent same or similar parts in the drawings and embodiments.

Figure 1:
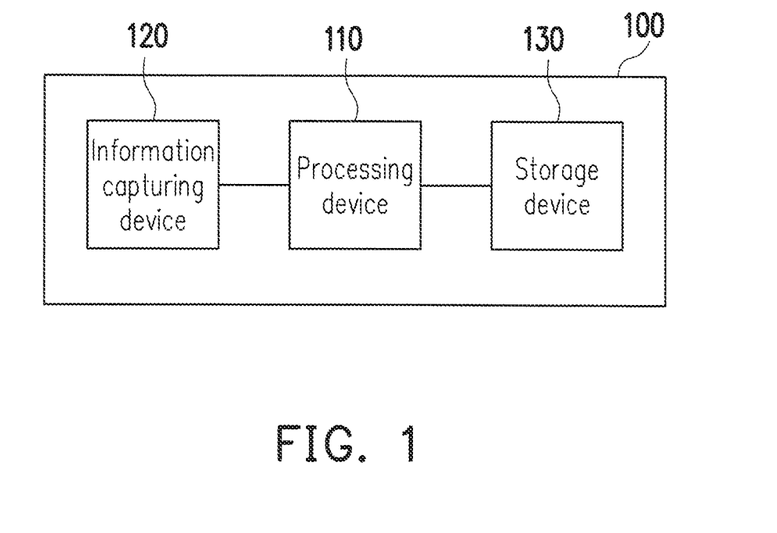
FIG. 1 is a block diagram of a wearable device according to an embodiment of the invention.

FIG. 1 is a block diagram of a wearable device according to an embodiment of the invention. With reference to FIG. 1, a wearable device 100 includes a processing device 110, an information capturing device 120 and a storage device 130. In the present embodiment, the wearable device 100 may be, for example, various portable apparatuses or various portable electronic devices, including a watch, a wristband, a ring, glasses or a cell phone, which are not particularly limited by the invention. In the present embodiment, the information capturing device 120 can be used to dynamically capture a plurality of partial detected object information of a detected object in a sub-action of a dynamic event, where the dynamic event may include a plurality of the sub-actions. The processing device 110 is coupled to the information capturing device 120 to receive the partial detected object information. Further, the processing device 110 can perform an accumulation operation according to the partial detected object information in the sub-action of the dynamic event, so as to obtain a plurality of location information of the detected object in the sub-action of the dynamic event.

In other words, the wearable device 100 of the present embodiment can capture a plurality of continuous and gradually-changing partial detected object information in the sub-action of the dynamic event through the information capturing device 120. Then, the processing device 110 accumulates these partial detected object information, so as to efficiently put together the plurality of location information on the detected object in the dynamic event. In the present embodiment, the processing device 110 can record the location information by creating an information matrix. In other words, the processing device 110 can create the information matrix corresponding to the sub-action of the dynamic event, so as to provide the user detailed information regarding change of state in the detected object.

In the present embodiment, the processing device 110 further compares the location information in the sub-action of the dynamic event with the location information in a previous sub-action, so as to obtain a sub-object distribution information corresponding to the sub-action of the dynamic event. Furthermore, in the present embodiment, the sub-object distribution information can include an added sub-object information or a removed sub-object distribution information. In the present embodiment, the previous sub-action is prior to the sub-action.

For illustrative convenience, implementation for the wearable device 100 of the invention is described below with a game event as an example. Nonetheless, the wearable device 100 of the invention is not limited only for recording playing information in the game event. However, the wearable device 100 of the invention is also be applicable to a parking lot vehicle/parking spaces recording task for recording parking information of parking spaces or seats recording task for recording seats information for the seats. Accordingly, the sub-action may be, for example, a piece-moving action, an action for detecting the parking spaces or an action for detecting the seats. The detected object may be, for example, a board, a parking lot, classroom seats or cinema seats, and the sub-object may be, for example, a piece, a vehicle or a person. The sub-object distribution information may be, for example, distribution of the pieces, vehicles or persons on the board, in the parking lot or in the classroom seat, respectively. The added sub-object information may be, for example, information regarding the piece, the vehicle or the person being added to one of piece locations on the board, one of the parking spaces in the parking lot, or one of the classroom seats, respectively. Also, the removed sub-object information may be, for example, information regarding the piece, the vehicle or the person being removed from one of piece locations on the board, one of the parking spaces in the parking lot, or one of the classroom seats, respectively.

For instance, the dynamic event may be, for example, a game event (e.g., Go game). The detected object may be, for example, the board, and the sub-object may be, for example, the piece. The sub-action may refer to one piece-moving action performed by the user. The sub-object distribution information may be, for example, a piece distribution information, and the added sub-object information and the removed sub-object information may be, for example, a placed piece information and a picked-up piece information, respectively. As such, the wearable device 100 is adapted to dynamically capture a plurality of partial board information of the board in each move of the game event. The processing device 110 performs the accumulation operation according to the partial detected object information in each move of the game event, so as to obtain a plurality of piece location information of the board in each step of the game event. In other words, the wearable device 100 of the present embodiment can capture a plurality of continuous and gradually-changing partial board information in each move of the game event by the information capturing device 120. Then, the processing device 110 accumulates these partial detected object information, so as to efficiently put together the plurality of piece location information on the board in the game event. In the present embodiment, the processing device 110 can record the piece location information by creating the information matrix. In other words, the processing device 110 can create the information matrix corresponding to each move of the game event, so as to provide the user detailed information regarding the game.

In the present embodiment, the piece location information (i.e., said location information) may respectively include a plurality of piece location coordinates and a plurality of piece location states corresponding to each other, and the piece location states may respectively indicate whether a piece is placed among the corresponding piece location coordinates. In the present embodiment, the accumulation operation refers to a process of respectively analyzing the partial board information to obtain the piece location coordinates and the corresponding piece states of at least a portion of the board by the processing device 110 and accumulating the piece location coordinates and the corresponding piece location states of the processing device 110. In addition, it should be noted that, the game event, the board and the piece as described in the present embodiment may be those used in various chess-like board games, including Chinese chess, Go-game, Five-in-a-row or chess, rather than being limited only be what illustrated in the drawing for the present embodiment.

In the present embodiment, the processing device 110 may be, for example, a central processing unit (CPU), or other programmable devices for general purpose or special purpose, such as a microprocessor and a digital signal processor (DSP), a programmable controller, an application specific integrated circuit (ASIC), a programmable logic device (PLD) or other similar devices or a combination of above-mentioned devices.

In the present embodiment, the information capturing device 120 may be, for example, an image capturing device, an ultrasonic wave sensing device, or a touch sensing device. The information capturing device 120 can sense the partial board information of the board through images, sounds or touch control. In other words, the information capturing device 120 can sense at least a portion of grid lines and the piece location coordinates of the board, and can sense at least a portion of the piece location states of the board. In the present embodiment, the processing device 110 can enter the detected partial board information to a data processing, so as to organize and create the placed piece information and the picked-up piece information regarding the board in each move of the game event. Further, in the present embodiment, each of the placed piece information (i.e., said added sub-object information) and the picked-up piece information (i.e., said removed sub-object information) may further include information of a related sequence, so as to further mark up the placed piece information belonging an $N^{th}$ move or the picked-up piece information belonging an $M^{th}$ move, where N and M are positive integer greater than 0.

In the present embodiment, the storage device 130 may be a dynamic random access memory (DRAM), a flash memory or a non-volatile random access memory (NVRAM). The storage device 130 can store the piece location information, the board information and the piece information as described in each embodiment of the invention. Moreover, the storage device 130 can further store a plurality of modules, which can be read and executed by the processing device 110. In the present embodiment, the processing device 110 may be configured to execute the modules in order to realize operating method and game recording method as described in each embodiment of the invention.

Figure 2:
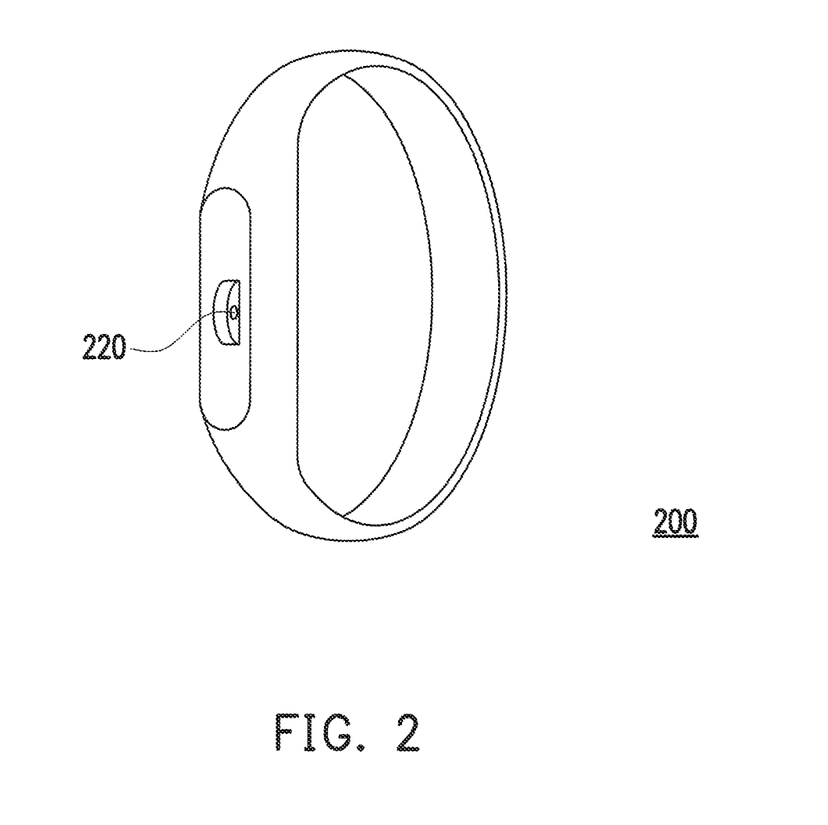
FIG. 2 is a schematic diagram of a wearable device according to an embodiment of the invention.

FIG. 2 is a schematic diagram of a wearable device according to an embodiment of the invention. With reference to FIG. 2, a wearable device 200 of the present embodiment is a wristband, for example. In the present embodiment, the wearable device 200 can include an image capturing device 220. The image capturing device 220 is configured to dynamically capture a plurality of image frames in a sub-action of a dynamic event, where the image frames include an image frame of at least one partial region of a detected object.

Taking the game event for example, the image capturing device 220 can dynamically capture the image frames in one specific move of the game event, where the image frames include a board image of at least one region of the board. In other words, when a player holding the piece carries the wearable device 200 on the wrist, the image capturing device 220 can dynamically capture multiple image frames once the player moves the hand on top of the board. In this case, the wearable device 200 can perform an image processing on the image frames, so as to determine whether board grid lines appear among the image frames for deciding to further determine the piece location information in the image frames. Then, the wearable device 200 can accumulate the piece location information in each of the image frames, so as to create a partial piece location information of at least a portion of the board.

Figure 3A:
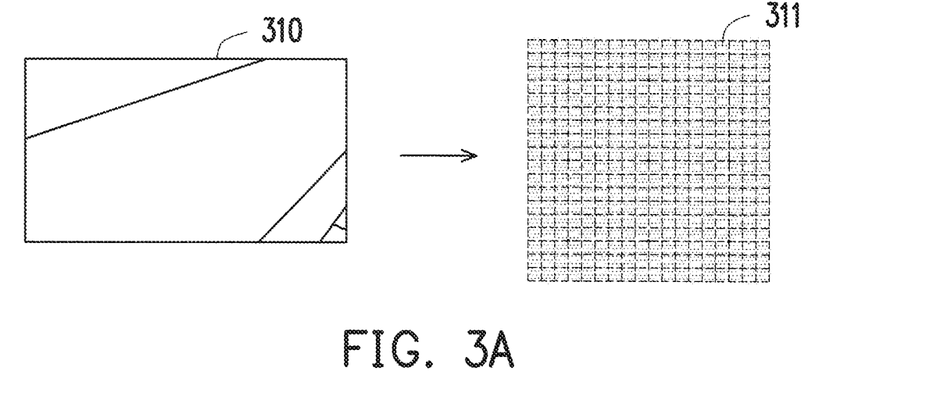
FIG. 3A to FIG. 3E are schematic diagrams illustrating scenarios for a detected object according to an embodiment of the invention.

FIG. 3A to FIG. 3E are schematic diagrams illustrating scenarios for a detected object according to an embodiment of the invention. Referring to FIG. 2 and FIG. 3A to FIG. 3E together, in the example of the game event, a player can carry the wristband of FIG. 2. In the scenario of FIG. 3A, when the player has not yet moving the hand on top of a board B, the wearable device 200 can determine that the board grid lines do not appear in an image frame 310 captured by the image capturing device 220. In this case, the wearable device 200 does not process and analyze the image frame 310. In other words, a data simulation scenario 311 correspondingly recorded by the wearable device 200 is not recorded with any piece location information yet.

Figure 3B:
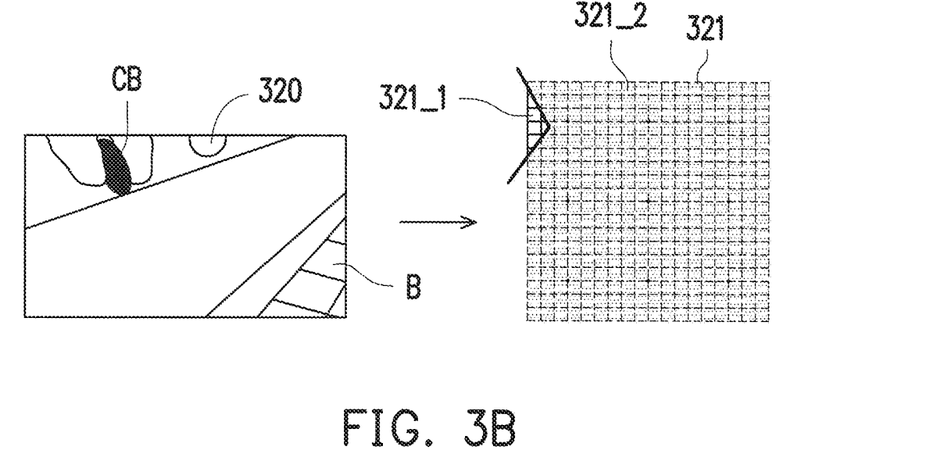

In the scenario of FIG. 3B, as the hand of the player begins to gradually move on top of the board B, the wearable device 200 can determine that the board grid lines appear in an image frame 320 captured by the image capturing device 220. In this case, the wearable device 200 can process and analyze the image frame 320, so as to analyze the image frame 320. In other words, a partial region 321_1 in a data simulation scenario 321 correspondingly recorded by the wearable device 200 is recorded with the partial piece location information. The portion of the board B not captured by the image capturing device 220 can refer to another region 321_2 in the data simulation scenario 321 correspondingly recorded by the wearable device 200, which is not recorded with any piece location information yet.

Figure 3C:
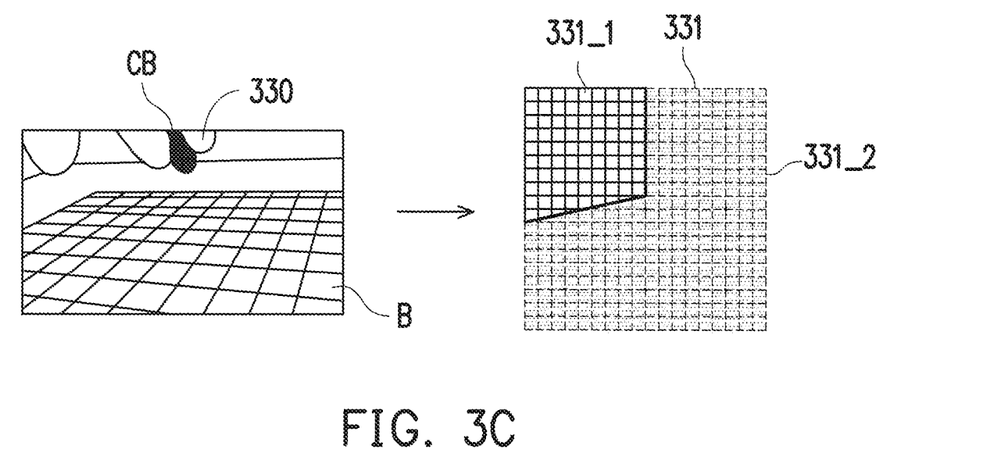

In the scenario of FIG. 3C, as the hand of the player moves farther on top of the board B, the wearable device 200 can determine that the board grid lines appear in an image frame 330 captured by the image capturing device 220. In this case, the wearable device 200 can process the image frame 330, so as to analyze the image frame 330. In other words, a partial region 331_1 in a data simulation scenario 331 correspondingly recorded by the wearable device 200 is recorded with the partial piece location information. The portion of the board B not captured by the image capturing device 220 can refer to another region 331_2 in the data simulation scenario 331 correspondingly recorded by the wearable device 200, which is not recorded with any piece location information yet.

In comparison with the scenario of FIG. 3B, the image capturing device 220 can capture more of the board grid lines, and thus the wearable device 200 can obtain more of the piece location information in the scenario of FIG. 3C. In this case, the wearable device 200 can accumulate the piece location information in both the scenario of FIG. 3B and the scenario of FIG. 3C, so as to record even more of the piece location information.

Figure 3D:
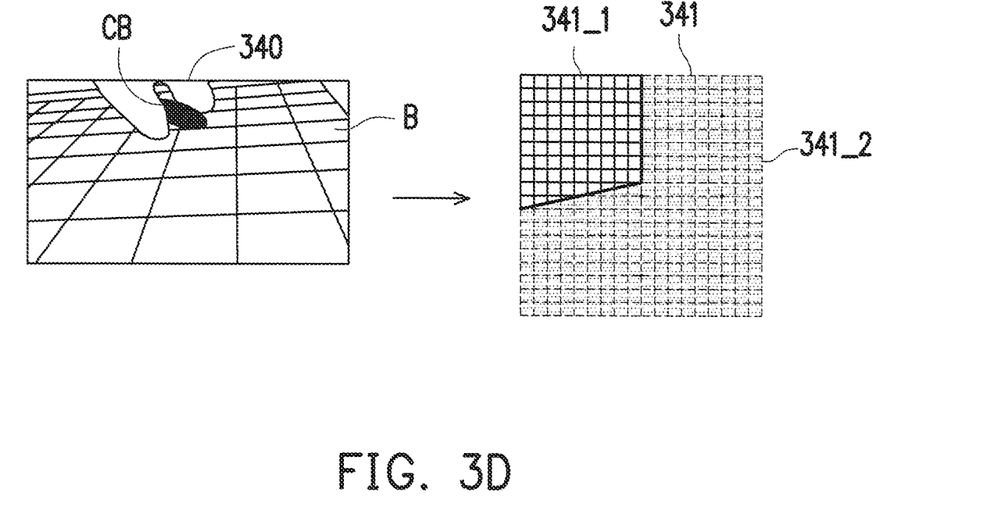

In the scenario of FIG. 3D, as the hand of the player moves even farther on top of the board B, the wearable device 200 can determine that the board grid lines appear in an image frame 340 captured by the image capturing device 220. In this case, the wearable device 200 can process the image frame 340, so as to analyze the image frame 340. In other words, a partial region 341_1 in a data simulation scenario 341 correspondingly recorded by the wearable device 200 is recorded with the partial piece location information. The portion of the board B not captured by the image capturing device 220 can refer to another region 341_2 in the data simulation scenario 341 correspondingly recorded by the wearable device 200, which is not recorded with any piece location information yet.

In comparison with the scenario of FIG. 3C, the image capturing device 220 can capture more of the board grid lines, and thus the wearable device 200 can obtain more of the piece location information in the scenario of FIG. 3D. In this case, the wearable device 200 can accumulate the piece location information in both the scenario of FIG. 3B and the scenario of FIG. 3C, so as to record even more of the piece location information. However, it should be noted that, because the layer has not yet place a black piece CB onto the board B in this scenario, the wearable device 200 is still unable to effectively determine whether there is the piece added on the board B.

Figure 3E:
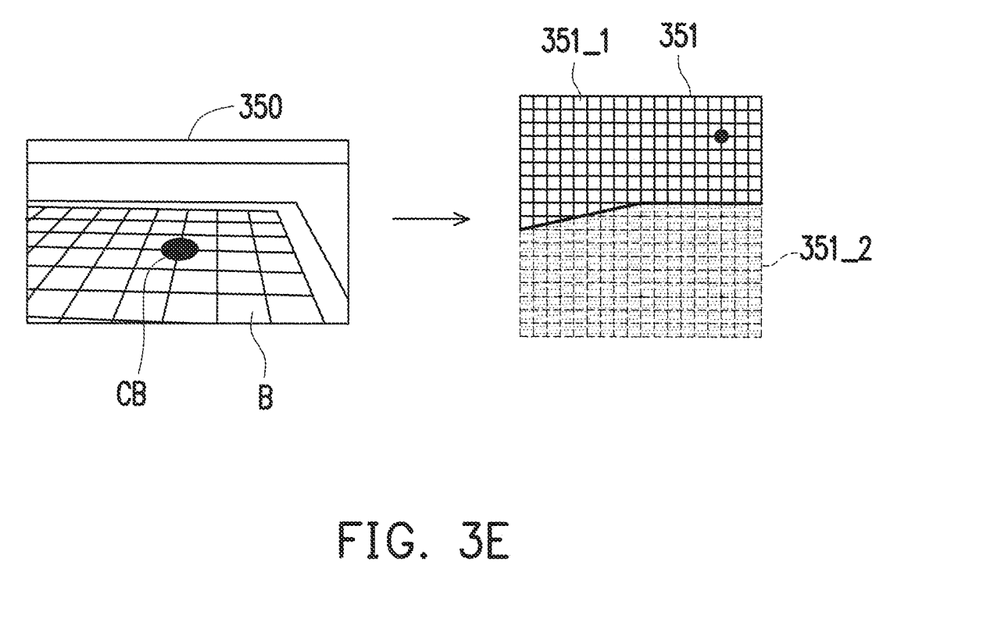

In the scenario of FIG. 3E, the wearable device 200 can determine that the board grid lines appear in an image frame 350 captured by the image capturing device 220. In this case, the wearable device 200 can process the image frame 350, so as to analyze the image frame 350. Further, because the player has placed the black piece CB onto the board B, the wearable device 200 can recognize that there is a difference in the piece location states at one specific piece location coordinate between the current move and the previous move. Therefore, the wearable device 200 can determine that a piece-placing action has occurred at the specific piece location coordinate according to the difference between the current move and the previous move, and record that the specific piece location coordinate has the placed piece information. In other words, a partial region 351_1 in a data simulation scenario 351 correspondingly recorded by the wearable device 200 is recorded with the partial piece location information, and includes one specific piece location information having the placed piece information as being recorded. Nevertheless, the portion of the board B not captured by the image capturing device 220 can refer to another region 351_2 in the data simulation scenario 351 correspondingly recorded by the wearable device 200, which is not recorded with any piece location information yet.

Figure 4:
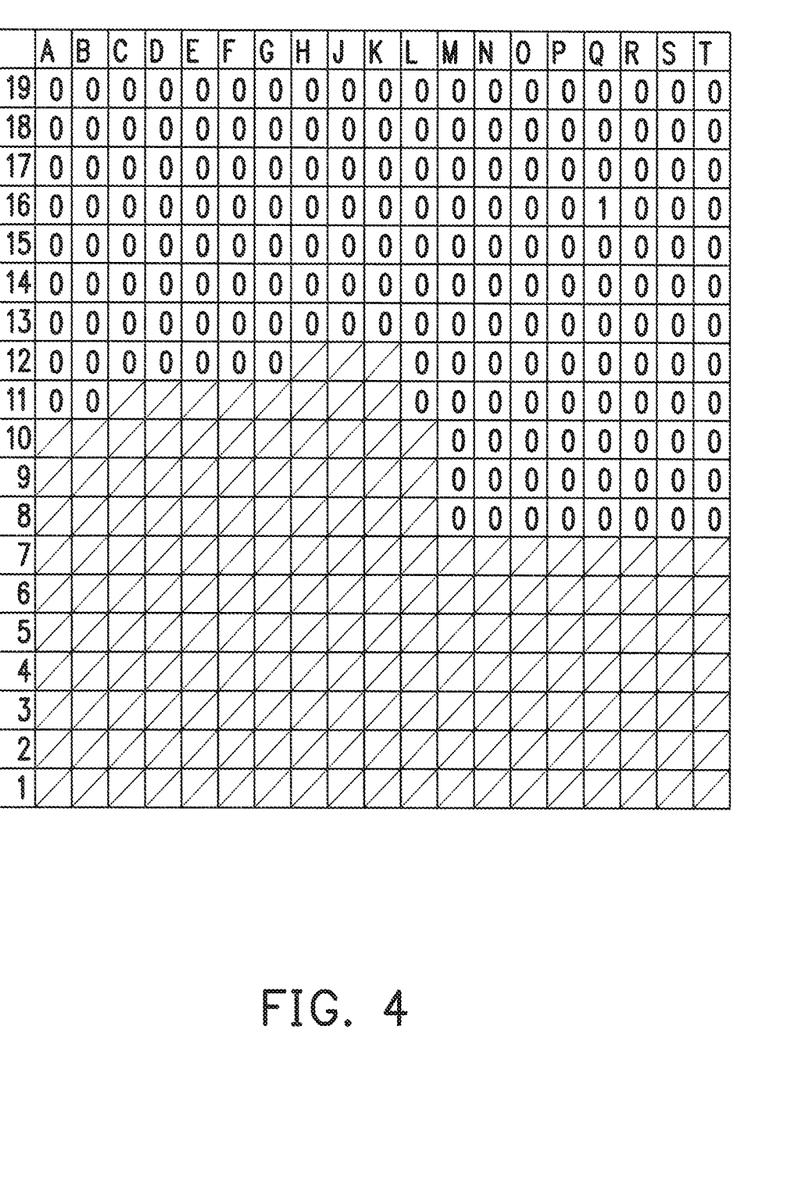
FIG. 4 is a schematic diagram of an information matrix according to an embodiment of the invention.

FIG. 4 is a schematic diagram of an information matrix according to an embodiment of the invention. With reference to FIG. 4, the wearable device in each embodiment of the invention can create an information matrix 410 as shown in FIG. 4. With the game event as an example, a plurality of piece location coordinates (A~T,1~19) can be included in the information matrix 410 of FIG. 4, in which a symbol 0 indicates that the respective coordinate is not yet placed with the piece and a symbol 1 indicates that the respective coordinate is placed with the piece (i.e., the piece location coordinate (Q,16)). In addition, the portion of the information matrix 410 not having any numeric symbol means that the piece location information of those regions are not yet captured by the wearable device. Accordingly, in the present embodiment, the wearable device can respectively create the information matrix 410 as shown in FIG. 4 for each move of the game event, which allows the processing device to compare the piece location information between each move and its previous move, so as to obtain the placed piece information in each move of the game event.

Figure 5:
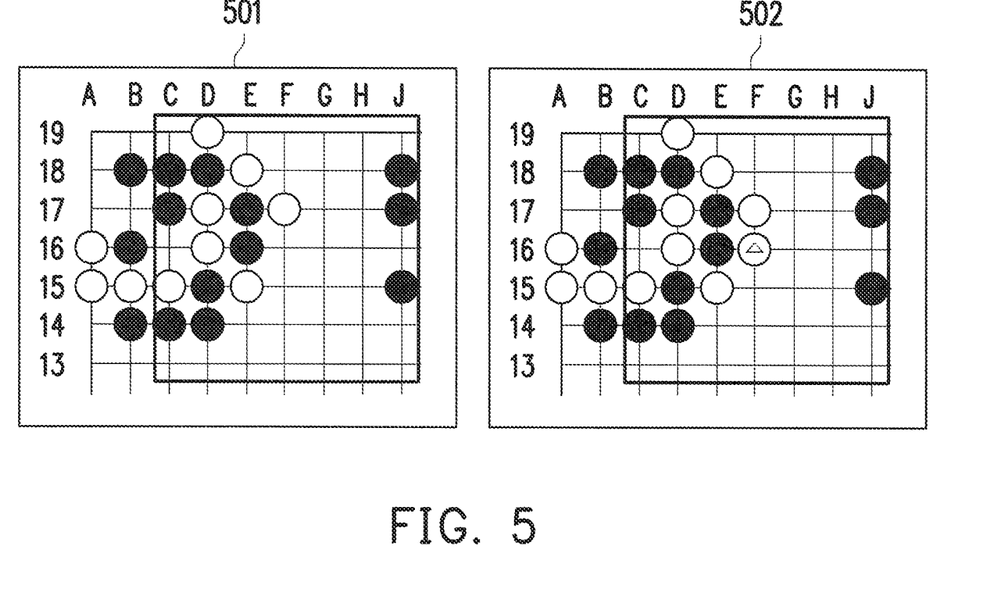
FIG. 5 is a schematic diagram illustrating a scenario for a placed sub-object according to an embodiment of the invention.

FIG. 5 is a schematic diagram illustrating a scenario for a placed sub-object according to an embodiment of the invention. With reference to FIG. 1 and FIG. 5, a white piece is taken as an example. During the game event, the information capturing device 120 can capture a partial board scenario 501 of the previous move on the board and capture a partial board scenario 502 of the current move on the board. The processing device 110 can compare the partial board scenario 501 with the partial board scenario 502, so as to determine that the white piece is added at a board coordinate (F,16). Accordingly, the processing device 110 can record information regarding that the piece location state at the board coordinate (F,16) is being placed with the white piece, and further record a placed sequence of the white piece as the placed piece information.

Figure 6:
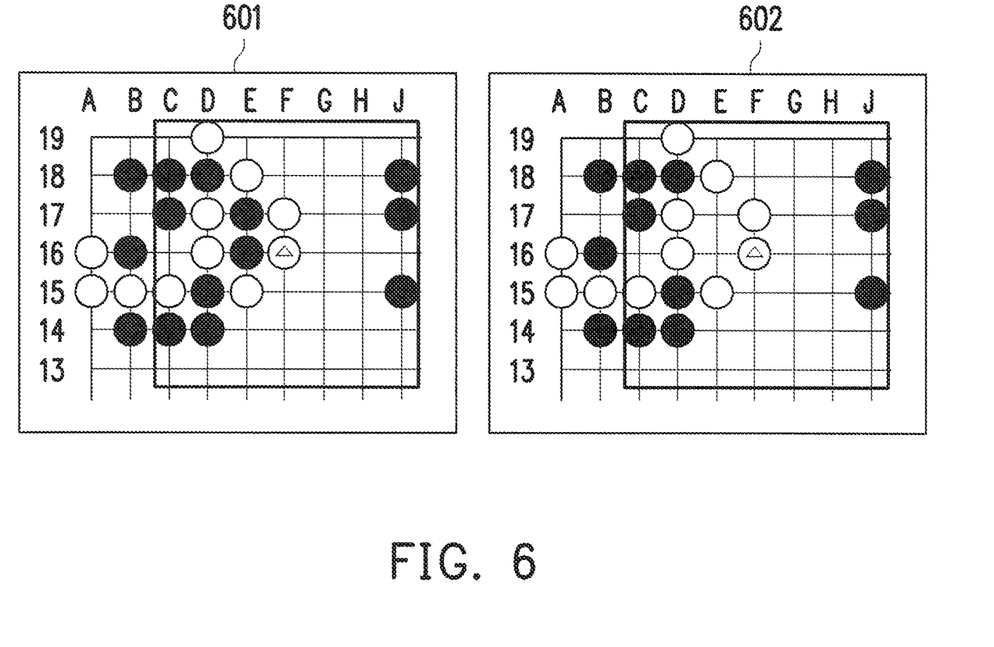
FIG. 6 is a schematic diagram illustrating a scenario for a picked-up sub-object according to an embodiment of the invention.

FIG. 6 is a schematic diagram illustrating a scenario for a picked-up sub-object according to an embodiment of the invention. With reference to FIG. 1 and FIG. 6, the black piece is taken as an example. During the game event, the information capturing device 120 can capture a partial board scenario 601 of the previous move on the board and capture a partial board scenario 602 of the current move on the board. In this scenario, the processing device 110 can compare the partial board scenario 601 with the partial board scenario 602, so as to determine that two black pieces are removed from a board coordinate (E,16) and a board coordinate (E,17). Accordingly, the processing device 110 can record information regarding that the piece location states at the board coordinate (E,16) and the board coordinate (E,17) are where the piece is not being placed, and further record a plurality of piece location information within a preset range of the board coordinate (E,16) and the board coordinate (E,17) as the picked-up piece information, which can be attached to the information regarding the added white piece at the board coordinate (F,16) to increase a recognition rate.

Figure 7:
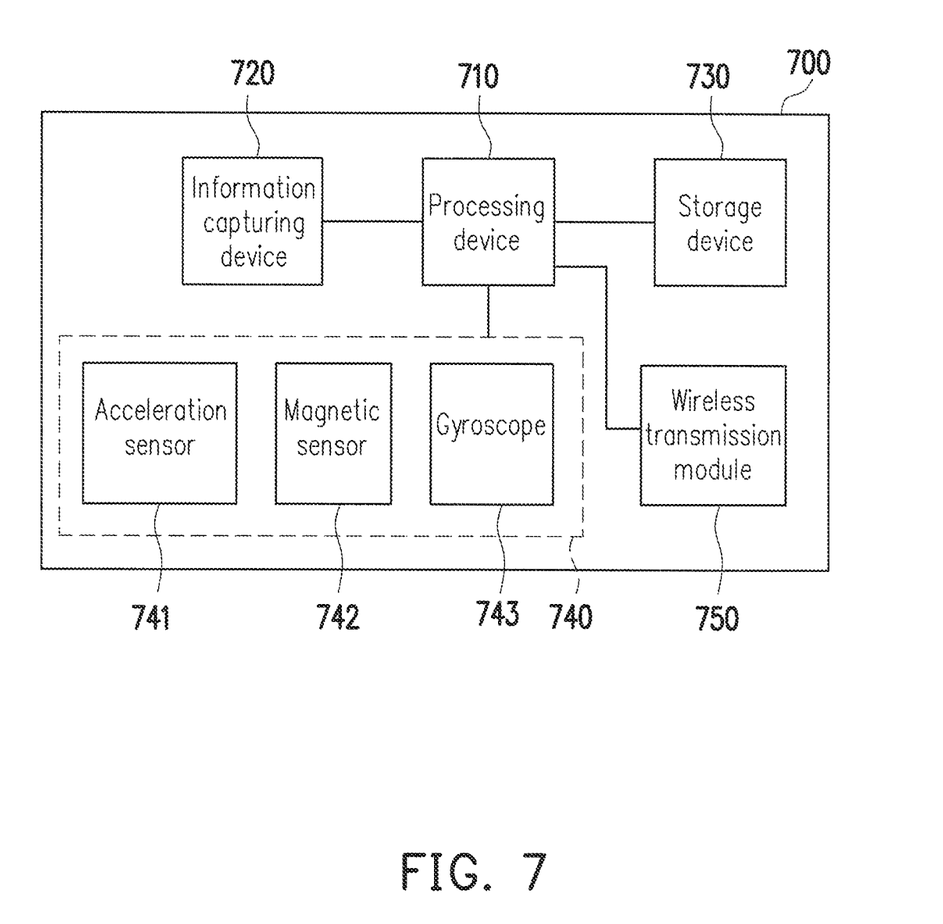
FIG. 7 is a block diagram of a wearable device according to another embodiment of the invention.

FIG. 7 is a block diagram of a wearable device according to another embodiment of the invention. With reference to FIG. 7, a wearable device 700 includes a processing device 710, an information capturing device 720 and a storage device 730. In addition, in comparison with the wearable device 100 in the embodiment of FIG. 1, a multi-axial sensing module 740 and a wireless transmission module 750 are further included. In the present embodiment, the multi-axial sensing module 740 includes an acceleration sensor 741, a magnetic sensor 742 and a gyroscope 743. The acceleration sensor 741 may be used to sense an acceleration parameter of the wearable device 700 in translation. The magnetic sensor 742 may be used to sense an orientation parameter of the wearable device 700 corresponding to earth magnetism. The gyroscope 743 may be used to sense a direction information of the wearable device. In the present embodiment, the wearable device 700 can adjust the location information obtained in each embodiment of the invention according to at least one of the acceleration parameter, the orientation parameter and the direction information. In other words, the wearable device 700 of the preset embodiment can prevent the situation where the partial detected object information captured by the information capturing device 720 cannot be used to perform the accumulation operation accurately when the user does not perform data capturing actions regularly in a specific direction of the detected object.

In the present embodiment, the wireless transmission module 750 may be, for example, a Bluetooth transmission device or a Wi-Fi transmission device, which are not particularly limited by the invention. In the present embodiment, the wireless transmission device 750 may be wirelessly coupled to another wearable device, so as to transmit the recorded location information to the another wearable device. In other words, in the example of the game event, the wearable device 700 can perform a synchronous game recording operation in cooperation with the another wearable device so as to synchronously record playing moves for the pieces in different colors. Nonetheless, in an embodiment, the wireless transmission device 750 may also be wirelessly coupled to another processing device such that the wearable device 700 can perform data processing or integrating operation in cooperation with a cloud system, but the invention is not limited thereto.

Further, enough teaching, suggestion, and implementation related to details for realizing the processing device 710, the information capturing device 720 and the storage device 730 described in the present embodiment can be obtained according to the related descriptions for the processing device 110, the information capturing device 120 and the storage device 130 in the embodiment of FIG. 1, which are not repeated hereinafter.

Figure 8:
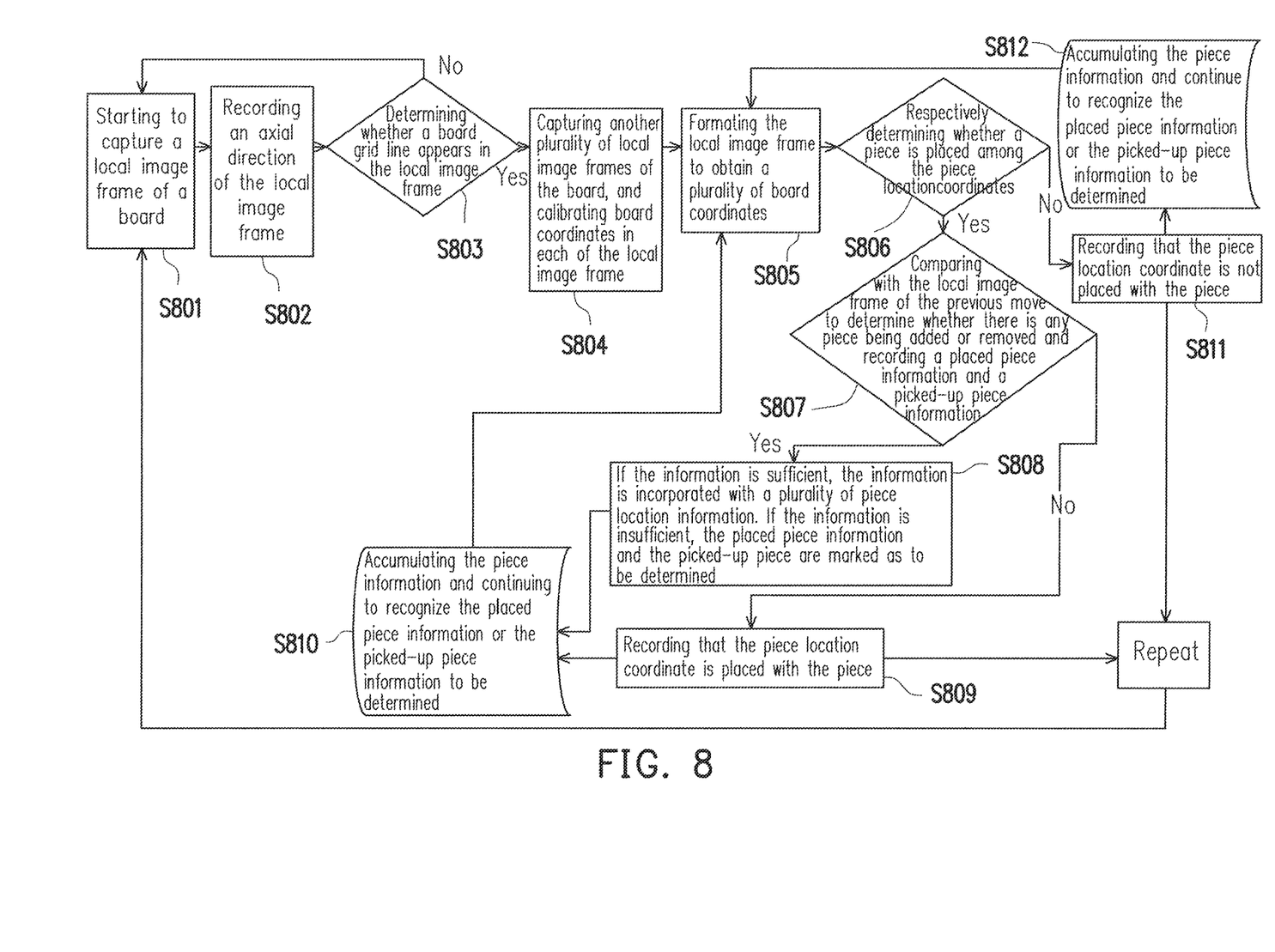
FIG. 8 is a flowchart of a dynamic event recording method according to an embodiment of the invention.

FIG. 8 is a flowchart of a dynamic event recording method according to an embodiment of the invention. With the game event taken as an example, the present embodiment may be used to describe flows in the operation performed by the wearable device 700 for each move in the game event. With reference to FIG. 7 and FIG. 8, an operating method of the wearable device of the present embodiment is at least applicable to the wearable device 700 of FIG. 7. First of all, in step S801, the information capturing device 720 starts to capture a partial image frame of a board. In step S802, the multi-axial sensing module 740 records an axial direction of the partial image frame. In step S803, the processing device 710 determines whether a board coordinate appears in the partial image frame. If no, the processing device 710 executes step S801 or stops operating. If yes, in step S804, the information capturing device 720 continuously captures other plurality of partial image frames of the board, and the processing device 710 adjusts board coordinates in the partial image frame according to the axial information recorded by the multi-axial sensing module 740.

For each of the partial image frames of the board, in step S805, the processing device 710 formats the partial image frame to obtain a plurality of board coordinates. In step S806, the processing device 710 respectively determines whether a piece is placed among the piece location coordinates. If yes, the processing device 710 executes step S807. If not, the processing device 710 executes step S811.

In step S807, the processing device 710 compares the partial image frame of the current move with the partial image frame of the previous move, so as to determine whether there is any piece being added or removed and record a placed piece information and a picked-up piece information. If yes, the processing device 710 executes step S808. If no, the processing device 710 executes step S809. The processing device 710 further determines whether the information is sufficient in step S808. If the information is sufficient, the information is incorporated with a plurality of piece location information. If the information is insufficient, the placed piece information and the picked-up piece are marked as to be determined. In step S809, the processing device 710 records that the piece location coordinate is placed with the piece. Then, after the step S808, the processing device 710 executes step S810 so as to accumulate the piece information and continue to recognize the placed piece information or the picked-up piece information to be determined. After step S809, the processing device 710 also executes step S810 and repeatedly executes step S801.

In step S811, the processing device 701 records that the piece location coordinate is not placed with the piece. Further, after step S811, the processing device 710 executes step S812 and repeatedly executes step S801 so as to accumulate the piece information and continue to recognize the placed piece information or the picked-up piece information to be determined. It should be noted that, step S810 and step S812 will stop after the placed piece information or the picked-up piece information to be determined is successfully recognized by the processing device 710. Otherwise the processing device 710 continues to format next partial image frame of the board, and performs an operation on the next partial image frame as described above.

Figure 9:
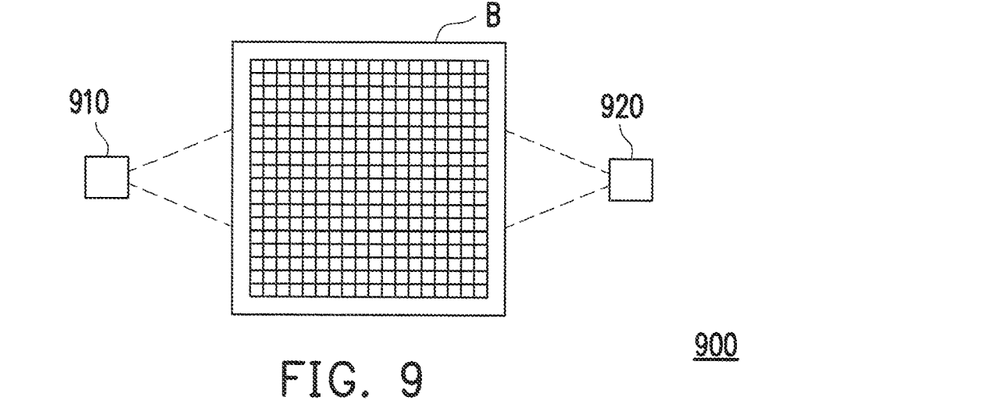
FIG. 9 is a block diagram of a dynamic event recording system according to an embodiment of the invention.
Figure 10:
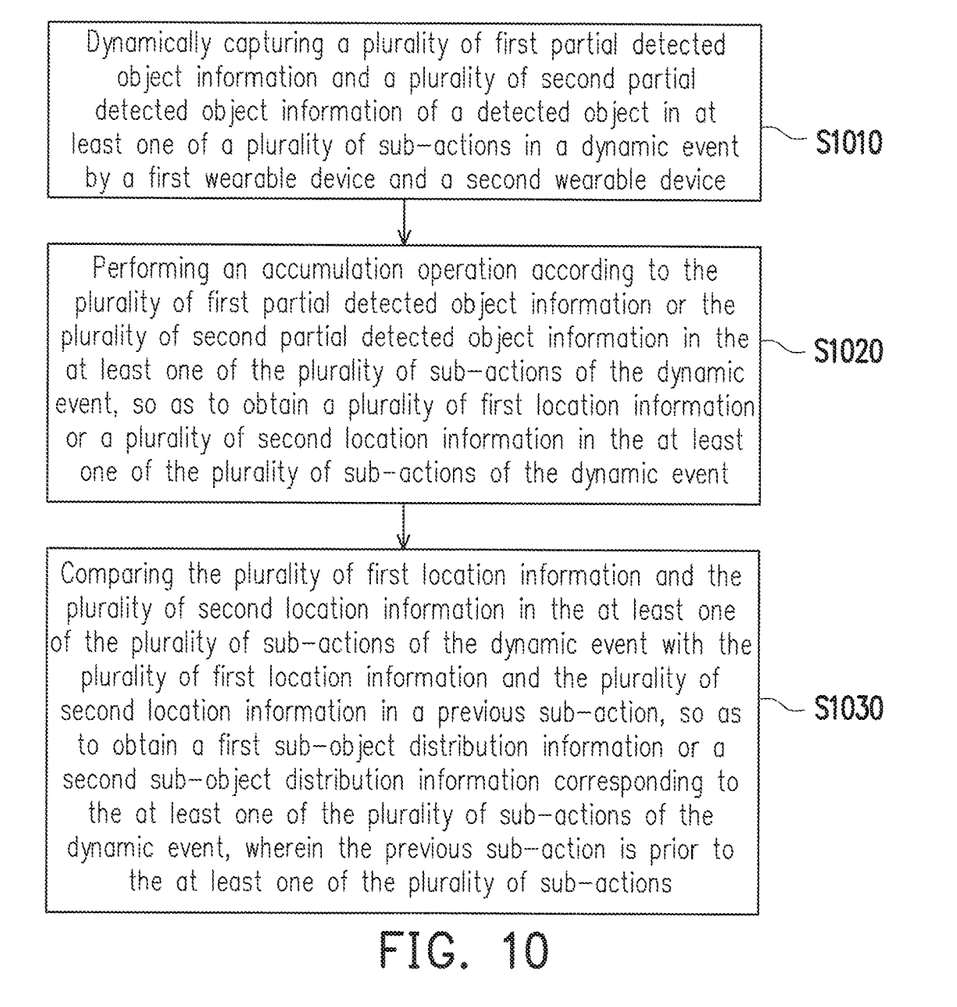
FIG. 10 is a flowchart of a dynamic event recording method according to an embodiment of the invention.

FIG. 9 is a block diagram of a dynamic event recording system according to an embodiment of the invention. FIG. 10 is a flowchart of a dynamic event recording method according to an embodiment of the invention. With reference to FIGS. 9 and 10, a dynamic event recording method of FIG. 10 is at least applicable to a dynamic event recording system 900 of FIG. 9. With the game event taken as an example, in the present embodiment, the dynamic event recording system 900 can include a first wearable device 910 and a second wearable device 920. The first wearable device 910 and the second wearable device 920 may be worn by two players, respectively, so as to respectively record a first piece information and a second piece information corresponding to each other. Accordingly, in step S1010, the dynamic event recording system 900 can dynamically capture a plurality of first partial detected object information (the partial board information) and a plurality of second partial detected object information (the partial board information) of a detected object (the board B) in at least one of a plurality of sub-actions (each piece-moving action) of the dynamic event (the game event) by the first wearable device 910 and the second wearable device 920. In step S1020, the dynamic event recording system 900 can perform an accumulation operation according to the plurality of first partial detected object information and the plurality of second partial detected object information in the at least one of the plurality of sub-actions of the dynamic event, so as to obtain a plurality of first location information (the location information regarding a plurality of white pieces) or a plurality of second location information (the location information regarding a plurality of black pieces) in the at least one of the plurality of sub-actions of the dynamic event. In step S1030, the dynamic event recording system 900 can alternately or simultaneously compare the plurality of first location information and the plurality of second location information in the at least one of the sub-actions with the plurality of first location information and the plurality of second location information in a previous sub-action, so as to obtain a first sub-object distribution information (a distribution information of the white pieces) or a second sub-object distribution information (a distribution information of the black pieces) corresponding to the at least one of the plurality of sub-actions of the dynamic event. The previous sub-action is prior to the at least one of the plurality of sub-actions. Accordingly, the dynamic event recording system 900 can then simultaneously record the piece location information for the two different pieces in each move of the game event.

In addition, enough teaching, suggestion, and implementation related to device features and implementation details regarding the first wearable device 910 and the second wearable device 920 can be obtained according to related description for the wearable devices 100 and 700 in the embodiments of FIG. 1 and FIG. 7, which are not repeated hereinafter.

In summary, with the wearable device, the dynamic event recording system and the dynamic event recording method of the invention, the partial detected object information of the detected object in each move of the dynamic event can be dynamically captured, and the accumulation operation can be performed on the partial detected object information, so as to gradually create each location information on the detected object in an accumulation manner. In other words, because the wearable device of the invention does not need to capture and process information for the entire detected object in each move during the dynamic event, the wearable device of the invention can effectively reduce the time for data computation and requirement for the computing equipment. In addition, because the wearable device of the invention further includes the multi-axial sensing device for adjusting each of the partial detected object information by sensed multi-axial parameters, the wearable device of the invention can effectively record and recognize variations in an occupied state for multiple locations in each scenario. As a result, the wearable device, the dynamic event recording system and the dynamic event recording method of the invention are capable of capturing accurate and detailed dynamic information in real time, so as to provide an efficient and convenient dynamic recording function.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wearable device, comprising:
   an information capturing device, configured to dynamically capture a plurality of partial detected object information of a detected object and at least one sub-object in a sub-action of a dynamic event, wherein the detected object has a plurality of spacing positions and the at least one sub-object are respectively placed in the plurality of spacing positions; and
   a processing device, coupled to the information capturing device, and configured to perform an accumulation operation according to the plurality of partial detected object information, so as to obtain a plurality of location information corresponding to the sub-action of the dynamic event, wherein the processing device compares the plurality of location information in the sub-action of the dynamic event with the plurality of location information in a previous sub-action, so as to obtain a sub-object distribution information of the at least one sub-object in on the plurality of spacing positions corresponding to the sub-action of the dynamic event, wherein the previous sub-action is prior to the sub-action.

2. The wearable device as recited in claim 1, wherein the sub-object distribution information comprises an added sub-object information or a removed sub-object distribution information.

3. The wearable device as recited in claim 1, wherein the plurality of location information comprise a plurality of location coordinates and a plurality of location states corresponding to each other, and the plurality of location states are configured to indicate whether a sub-object is existed among the plurality of corresponding location coordinates.

4. The wearable device as recited in claim 3, wherein the accumulation operation comprises:
   analyzing the plurality of partial detected object information, so as to obtain the plurality of location coordinates and the plurality of corresponding location states of at least a portion of the detected object; and
   accumulating the plurality of location coordinates and the plurality of corresponding location states.

5. The wearable device as recited in claim 1, wherein the information capturing device is an image capturing device, and the image capturing device is configured to dynamically capture a plurality of image frames in the sub-action of the dynamic event, wherein the plurality of image frames comprise a frame of at least one partial region of the detected object.

6. The wearable device as recited in claim 5, wherein the processing device determines whether a grid line appears in the image frames, so as to decide to determine the location information in the image frames.

7. The wearable device as recited in claim 1, further comprising:
   a multi-axial sensing module, coupled to the processing device, and configured to sense at least one of an acceleration parameter, an orientation parameter and a direction information of the wearable device and allow the processing device to adjust the plurality of location information by the at least one of the acceleration parameter, the orientation parameter and the direction information.

8. The wearable device as recited in claim 1, wherein the dynamic event is a game event, and the information capturing device dynamically captures a plurality of partial board information of a board in a piece-moving action of the game event,
   wherein the processing device performs the accumulation operation according to the plurality of partial board information, so as to obtain a plurality of piece location information corresponding to the piece-moving action of the game event, and the processing device compares the plurality of piece location info nation in the piece-moving action of the game event with the plurality of piece location information in a previous piece-moving action, so as to obtain a piece distribution information corresponding to the piece-moving action of the game event, wherein the previous piece-moving action is prior to the piece-moving action.

9. A dynamic event recording system, comprising
   a first wearable device; and
   a second wearable device, wirelessly coupled to the first wearable device, wherein the first wearable device and the second wearable device are configured to dynamically capture a plurality of first partial detected object information and a plurality of second partial detected object information of a detected object in at least one of a plurality of sub-actions in a dynamic event, and perform an accumulation operation according to the plurality of first partial detected object information or the plurality of second partial detected object information in the at least one of the plurality of sub-actions of the dynamic event, so as to obtain a plurality of first location information or a plurality of second location information in the at least one of the plurality of sub-actions of the dynamic event, wherein the first wearable device and the second wearable device compare the plurality of first location information and the plurality of second location information in the at least one of the plurality of sub-actions of the dynamic event with the plurality of first location information and the plurality of second location information in a previous sub-action, so as to obtain a first sub-object distribution information or a second sub-object distribution information corresponding to the at least one of the plurality of sub-actions of the dynamic event, wherein the previous sub-action is prior to the at least one of the plurality of sub-actions.

10. The dynamic event recording system as recited in claim 9, wherein the first sub-object distribution information comprises an added first sub-object information or a removed first sub-object information, and the second sub-object distribution information comprises an added second sub-object information or a removed second sub-object information.

11. The dynamic event recording system as recited in claim 9, wherein the plurality of first location information comprise a plurality of first location coordinates and a plurality of first location states corresponding to each other, and the plurality of second location information comprise a plurality of second location coordinates and a plurality of second location states corresponding to each other, wherein the plurality of first location states are configured to indicate whether a first sub-object is existed among the plurality of corresponding first location coordinates, and the plurality of second partial states are configured to indicate whether a second sub-object is existed among the plurality of corresponding second location coordinates.

12. The dynamic event recording system as recited in claim 11, wherein the accumulation operation comprises:

analyzing the plurality of first partial detected object information or the plurality of second partial detected object information, so as to obtain the plurality of first location coordinates and the plurality of corresponding first location states or the plurality of second location coordinates and the plurality of corresponding second location states of at least a portion of the detected object; and accumulating the plurality of first location coordinates and the plurality of corresponding first location states or the plurality of second location coordinates and the plurality of corresponding second location states.

13. The dynamic event recording system as recited in claim 9, wherein the dynamic event is a game event, and the first wearable device and the second wearable device are configured to dynamically capture a plurality of first partial board information and a plurality of second partial board information of a board in at least one of a plurality of piece-moving actions of the game event, and perform the accumulation operation according to the plurality of first partial board information or the plurality of second partial board information in the at least one of the piece-moving actions of the game event, so as to obtain a plurality of first piece location information or a plurality of second piece location information in the at least one of the piece-moving actions of the game event, wherein the first wearable device and the second wearable device compare the plurality of first piece location information and the plurality of second piece location information in the at least one of the piece-moving actions of the game event with the plurality of first piece location information and the plurality of second piece location information in a previous piece-moving action, so as to obtain a first piece distribution information or a second piece distribution information corresponding to the at least one of the piece-moving actions of the game event, wherein the previous piece-moving action is prior to the at least one of the plurality of piece-moving actions.

14. A dynamic event recording method, comprising:

dynamically capturing a plurality of partial detected object information of a detected object and at least one sub-object in a sub-action of a dynamic event by an information capturing device, wherein the detected object has a plurality of spacing positions and the at least one sub-object are respectively placed in the plurality of spacing positions;

performing an accumulation operation according to the plurality of partial detected object information in the sub-action of the dynamic event, so as to obtain a plurality of location information corresponding to the sub-action of the dynamic event; and comparing the plurality of location information in the sub-action of the dynamic event with the plurality of location information in a previous sub-action, so as to obtain a sub-object distribution information of the at least one sub-object in on the plurality of spacing positions corresponding to the sub-action of the dynamic event, wherein the previous sub-action is prior to the sub-action.

15. The dynamic event recording method as recited in claim 14, wherein the sub-object distribution information comprises an added sub-object information or a removed sub-object distribution information.

16. The dynamic event recording method as recited in claim 14, wherein the plurality of location information comprise a plurality of location coordinates and a plurality of location states corresponding to each other, and the plurality of location states are configured to indicate whether a sub-object is existed among the plurality of corresponding location coordinates.

17. The dynamic event recording method as recited in claim 16, wherein the step of performing the accumulation operation according to the plurality of partial detected object information in the sub-action of the dynamic event comprises:

analyzing the plurality of partial detected object information, so as to obtain the plurality of location coordinates and the plurality of corresponding location states of at least a portion of the detected object; and accumulating the plurality of location coordinates and the plurality of corresponding location states.

18. The dynamic event recording method as recited in claim 14, further comprising:

sensing at least one of an acceleration parameter, an orientation parameter and a direction information; and adjusting the plurality of location information according to the at least one of the acceleration parameter, the orientation parameter and the direction information.

19. The dynamic event recording method as recited in claim 14, wherein the dynamic event is a game event, and the dynamic event recording method further comprises:
dynamically capturing a plurality of partial board information of a board in a piece-moving action of the game event by the information capturing device;
performing an accumulation operation according to the plurality of partial board information in the piece-moving action of the game event, so as to obtain a plurality of piece location information in the piece-moving action of the game event; and
comparing the plurality of piece location information in the piece-moving action of the game event with the plurality of piece location information in a previous piece-moving action, so as to obtain a piece distribution information corresponding to the piece-moving action of the game event, wherein the previous piece-moving action is prior to the piece-moving action.

20. A dynamic event recording method, comprising:
dynamically capturing a plurality of first partial detected object information and a plurality of second partial detected object information of a detected object in at least one of a plurality of sub-actions in a dynamic event by a first wearable device and a second wearable device;
performing an accumulation operation according to the plurality of first partial detected object information or the plurality of second partial detected object information in the at least one of the plurality of sub-actions of the dynamic event, so as to obtain a plurality of first location information or a plurality of second location information in the at least one of the plurality of sub-actions of the dynamic event; and
comparing the plurality of first location information and the plurality of second location information in the at least one of the plurality of sub-actions of the dynamic event with the plurality of first location information and the plurality of second location information in a previous sub-action, so as to obtain a first sub-object distribution information or a second sub-object distribution information corresponding to the at least one of the plurality of sub-actions of the dynamic event, wherein the previous sub-action is prior to the at least one of the plurality of sub-actions.

21. The dynamic event recording method as recited in claim 20, wherein the first sub-object distribution information comprises an added first sub-object information or a removed first sub-object information, and the second sub-object distribution information comprises an added second sub-object information or a removed second sub-object information.

22. The dynamic event recording method as recited in claim 20, wherein the plurality of first location information comprise a plurality of first location coordinates and a plurality of first location states corresponding to each other, and the plurality of second location information comprise a plurality of second location coordinates and a plurality of second location states corresponding to each other,
wherein the plurality of first location states are configured to indicate whether a first sub-object is existed among the plurality of corresponding first location coordinates, and the plurality of second location states are configured to indicate whether a second sub-object is existed among the plurality of corresponding second location coordinates.

23. The dynamic event recording method as recited in claim 22, wherein the step of performing the accumulation operation according to the plurality of first partial detected object information or the plurality of second partial detected object information in the at least one of the plurality of sub-actions of the dynamic event comprises:
analyzing the plurality of first partial detected object information or the plurality of second partial detected object information, so as to obtain the plurality of first location coordinates and the plurality of corresponding first location states or the plurality of second location coordinates and the plurality of corresponding second location states of at least a portion of the detected object; and
accumulating the plurality of first location coordinates and the plurality of corresponding first location states or the plurality of second location coordinates and the plurality of corresponding second location states.

24. The dynamic event recording method as recited in claim 20, wherein the dynamic event is a game event, and the dynamic event recording method further comprises:
dynamically capturing a plurality of first partial board information and a plurality of second partial board information of a board in at least one of a plurality of piece-moving actions of the game event by the first wearable device and the second wearable device;
performing the accumulation operation according to the plurality of first partial board information or the plurality of second partial board information in the at least one of the piece-moving actions of the game event, so as to obtain a plurality of first piece location information or a plurality of second piece location information in the at least one of the piece-moving actions of the game event; and
comparing the first piece location information and the second piece location information in the at least one of the piece-moving actions of the game event with the plurality of first piece location information and the plurality of second piece location information in a previous piece-moving action, so as to obtain a first piece distribution information or a second piece distribution information corresponding to the at least one of the piece-moving actions of the game event, wherein the previous piece-moving action is prior to the at least one of the piece-moving actions.

* * * * *